(12) United States Patent
Breitenbeck (10) Patent No.: US 9,745,713 B2
(45) Date of Patent: Aug. 29, 2017

(54) DEVICE FOR COASTAL RESTORATION

(75) Inventor: Gary Breitenbeck, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 505 days.

(21) Appl. No.: 14/234,290

(22) PCT Filed: Mar. 15, 2012

(86) PCT No.: PCT/US2012/029221
§ 371 (c)(1),
(2), (4) Date: May 13, 2014

(87) PCT Pub. No.: WO2012/125823
PCT Pub. Date: Sep. 20, 2012

(65) Prior Publication Data
US 2014/0270960 A1 Sep. 18, 2014

Related U.S. Application Data

(60) Provisional application No. 61/452,795, filed on Mar. 15, 2011.

(51) Int. Cl.
*E02B 3/12* (2006.01)
*E02B 3/04* (2006.01)
*E02D 29/02* (2006.01)

(52) U.S. Cl.
CPC ......... *E02D 29/0291* (2013.01); *E02D 29/02* (2013.01)

(58) Field of Classification Search
CPC ........ E02B 3/122; E02B 3/123; E02B 11/005; E01C 13/02; E01C 13/083; E02D 29/02; E02D 29/0291
USPC ........... 405/15–20, 32, 43, 45, 302.6, 302.7; 210/282, 484, 486; 383/38–40, 109–112, 383/117
See application file for complete search history.

(56) References Cited

U.S. PATENT DOCUMENTS 3,474,626 A * 10/1969 Colle ...................... E02B 3/127
405/18
3,561,219 A * 2/1971 Nishizawa ............. D03D 25/00
405/19

(Continued)

FOREIGN PATENT DOCUMENTS

IT  WO 2012001504 A2 * 1/2012 ............. B32B 5/022

*Primary Examiner* — Benjamin Fiorello
*Assistant Examiner* — Stacy Warren
(74) *Attorney, Agent, or Firm* — Russel O. Primeaux; Kean Miller, LLP (57) ABSTRACT

The invention describes a system for creating portable, porous structures for restoring coastline. The invention provides for a bag with multiple longitudinal pockets. The bag is made of porous natural or synthetic mesh material and the pockets are filled with lightweight, porous manufactured aggregate. In a preferred embodiment, the lightweight aggregate used in this invention is produced by thermal fusion of silicate clays in a rotary kiln. In another preferred embodiment, multiple bags are encased in a flexible grid material to form a mat. In another embodiment, the mat can be rolled into a log. The bags, mats, and logs can be placed on shorelines and other locations to restore coastline.

10 Claims, 6 Drawing Sheets

(56) References Cited

U.S. PATENT DOCUMENTS

| | | | | |
|---|---|---|---|---|
| 4,449,847 A | * | 5/1984 | Scales | E02B 3/127 |
| | | | | 405/17 |
| 4,657,433 A | | 4/1987 | Holmberg | |
| 4,940,364 A | * | 7/1990 | Dlugosz | E01C 3/006 |
| | | | | 405/129.6 |
| 5,421,123 A | | 6/1995 | Sakate et al. | |
| 5,452,968 A | * | 9/1995 | Dlugosz | E04H 12/22 |
| | | | | 126/152 R |
| 5,678,954 A | * | 10/1997 | Bestmann | E02B 3/125 |
| | | | | 405/16 |
| 6,056,438 A | * | 5/2000 | Bradley | E02B 3/127 |
| | | | | 112/475.08 |
| 6,183,242 B1 | * | 2/2001 | Heian | C04B 18/027 |
| | | | | 432/11 |
| 7,029,208 B1 | | 4/2006 | Santha | |
| 2002/0164210 A1 | | 11/2002 | Davis et al. | |
| 2004/0005198 A1 | | 1/2004 | Spangler et al. | |
| 2004/0022583 A1 | * | 2/2004 | Bussey, Jr. | E02B 11/005 |
| | | | | 405/43 |
| 2005/0161407 A1 | * | 7/2005 | McPhillips | A01N 25/08 |
| | | | | 210/747.3 |
| 2006/0210360 A1 | * | 9/2006 | Slater | E02B 3/108 |
| | | | | 405/114 |
| 2007/0009327 A1 | * | 1/2007 | Sanguinetti | E02B 3/04 |
| | | | | 405/115 |
| 2007/0095747 A1 | | 5/2007 | Theisen et al. | |
| 2009/0257827 A1 | * | 10/2009 | Wilson | E02D 17/20 |
| | | | | 405/21 |
| 2009/0266767 A1 | * | 10/2009 | McInnis | C02F 1/42 |
| | | | | 210/688 |

\* cited by examiner

DEVICE FOR COASTAL RESTORATION

CROSS REFERENCES TO RELATED APPLICATION

Priority of U.S. Provisional Application 61/452,795, filed Mar. 15, 2011, incorporated herein by reference, is hereby claimed.

STATEMENTS AS TO THE RIGHTS TO THE INVENTION MADE UNDER FEDERALLY SPONSORED RESEARCH AND DEVELOPMENT

None

TECHNICAL FIELD

The invention describes a system for creating portable, readily transportable, porous structures for controlling, containing, or bridging aqueous environments. In one embodiment, semi-permanent retaining walls were built on unconsolidated sediments near shorelines in the coastal zone. In another embodiment, the intertidal area is blanketed for erosion control until vegetation can re-establish. These structures were constructed using tubes of burlap or synthetic mesh filled with lightweight, porous manufactured aggregate. The lightweight aggregate used in this invention is produced by thermal fusion of silicate clays in a rotary kiln. The aggregate produced by this process is manufactured and commercially available in Louisiana and other states. The structures described herein were developed to offer low-cost, effective solutions for coastal wetland protection and restoration by exploiting the unique characteristics of this lightweight manufactured aggregate.

BACKGROUND

It is currently very difficult to restore small sections of shoreline in the coastal marshes. While there are many styles of seawalls and levees available, these walls and levees are costly and difficult to deploy in many wetland environments. Typically, marsh buggies equipped with backhoes are used to dredge deep, consolidated sediment that is then used to construct berms or levees. Because of the weight and highly erosive nature of these sediments, these berms are generally large, inhibit tidal flow into the protected wetland and do not provide a suitable environment for restoring wetland vegetation. Granite or limestone riprap is sometimes used to protect shorelines, but the weight of these materials causes rapid subsidence and the riprap barriers must be frequently replenished with additional stone.

Fiber logs are commonly used to provide short to intermediate term protection to damaged shoreline but they are awkward to deploy and tend to relocate during storm events. Moreover, fiber logs do not adequately protect new plantings from erosion. Inadequate elevation is a common cause of failure when attempting to replant eroded areas but generally there are no low-cost methods for increasing sediment elevation.

Oil spills pose another danger to shorelines and coastal areas, especially because they can kill vegetation. Therefore, it is important to prevent the oil from contacting the vegetation. Floating booms are hard to keep in place. If the spill is not intercepted, coastal and beach cleanup must be performed subsequent to an oil spill and the oil that has permeated into soil and sand is difficult to remove.

DISCLOSURE

When structures made in accordance with the present invention are employed, the structures are built by stacking bags of lightweight aggregate. The tubular design of the bags allows interlocking to create a highly stable wall without the need to construct a level foundation. Unlike conventional single chamber sandbags, these lightweight devices are easily handled. By creating walls with a density similar to unconsolidated marsh sediments, the walls do not sink or bloat, and thus are quite stable. As a result, walls constructed of these devices are not subject to rapid subsidence into the muddy sediments normally associated with retaining walls and barriers constructed of riprap, concrete or most other materials used to protect habitat in the coastal zone. Moreover, the coarse, porous fabric and porous gravel allow tidal flow to pass through the wall, resulting in suspended sediment becoming entrapped within the walls.

When deployed in marsh environments with adequate tidal flow, retaining walls constructed from these devices are converted to a mixture of aggregate and fine sediments over time. Where the upper elevation of these walls does not exceed mean high tide, the cap layer can be planted with coastal vegetation to further stabilize the wall and create valuable habitat. Variants of these devices are designed for application at or above the high tide line to protect damaged areas from erosion and promote re-establishment of vegetation.

In another embodiment, this system may be used as portable retaining walls designed to intercept and absorb spilled oil and/or other contaminants before impacting beaches and marsh sediment. In this embodiment, water would pass through the retaining wall while oil and/or other materials would be captured by the wall.

In another embodiment, these structures may be used as semi-permanent roadways. In this embodiment, water can pass through structures so no "damming" effect occurs, but a solid surface is in place to allow vehicle traffic.

The devices and methods disclosed herein offer a cost-effective, flexible and scalable approach for the protection and restoration of shorelines, stream banks and coastal wetlands. The devices are designed not only to provide immediate protection against erosion, but also to facilitate colonization by vegetation and other marine life that transform the devices into stable, productive structures that enhance ecosystem function.

The invention described herein is based on basic building units of lightweight aggregate encapsulated in a biodegradable or poly mesh fabric that is used for construction of barriers, breakwaters and shoreline revetment. Because of the low density of these units, they sink in seawater but rest on the surface of marsh sediments where they form a stable environment for colonization by emergent vegetation, oysters and other coastal life.

Unlike protective structures created with concrete, rock or sand, structures constructed in accordance with the invention do not subside rapidly into semi-fluid marsh sediments, but instead remain near the sediment surface where they accrete additional sediments and organic debris. In applications where wave or current energy is a concern, multiple units are encased in porous grid material to form revetment mats, logs, breakwaters and other structures that initially are anchored in position until they eventually become an integral and permanent part of a hardened substrate that continues to protect threatened shorelines.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed.

MODES FOR CARRYING OUT THE INVENTION

Figure 1:
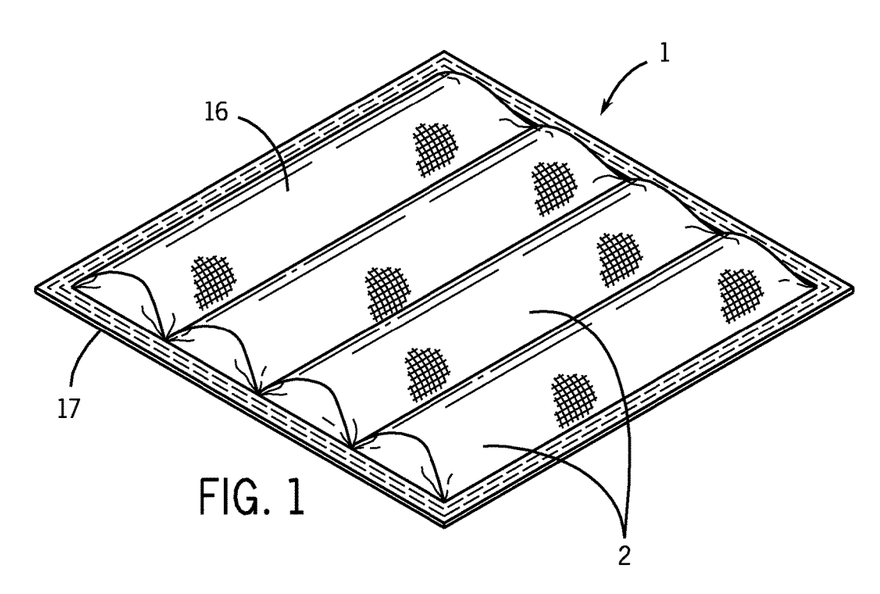
FIG. 1 depicts a preferred embodiment of a pocket bag.

With reference to FIG. 1, a preferred embodiment of the coastal restoration device is shown as multi-pocket bag 1. Bag 1 has first side 16 and second side 17 (not shown). Durable fabric that is stitched to form multiple lateral tube-shaped pockets 2 that can be filled with aggregate prior to closing the tubes with a bag closer. Pockets 2 are formed by fastening first side 16 to second 17 in lines so as to create the size pockets 2 that are desired. The fastening of first side 16 to second 17 can be done by stitching or by other methods of fastening known in the art (e.g. cable ties, staples, plastic welding, adhesive, etc.).

Various combinations of fabric and aggregate can be used to construct devices for specific purposes, depending on the size of particulates that should pass into the interior of the bag, biodegradability and durability. By fabric, the applicant is referring to any material which is suitable for holding the aggregate in place while allowing water to penetrate into the pockets. Fabrics which may be suitable include burlap, landscape fabric, or other fabrics which may be made from either natural fibers or synthetic materials.

Partitioning the fabric bags into narrow pockets, or tubes, ensures that the bags will retain their shape after they are filled with aggregate. This design also ensures that a maximum thickness can be obtained with a minimum weight of aggregate. The maximum height achievable is determined by the width of the pocket as this will determine the diameter of each pocket when the pocket is completely filled with aggregate. In some applications, partially filling the pockets to produce a more flexible, lighter weight device with a lower profile is preferable.

Figure 3:
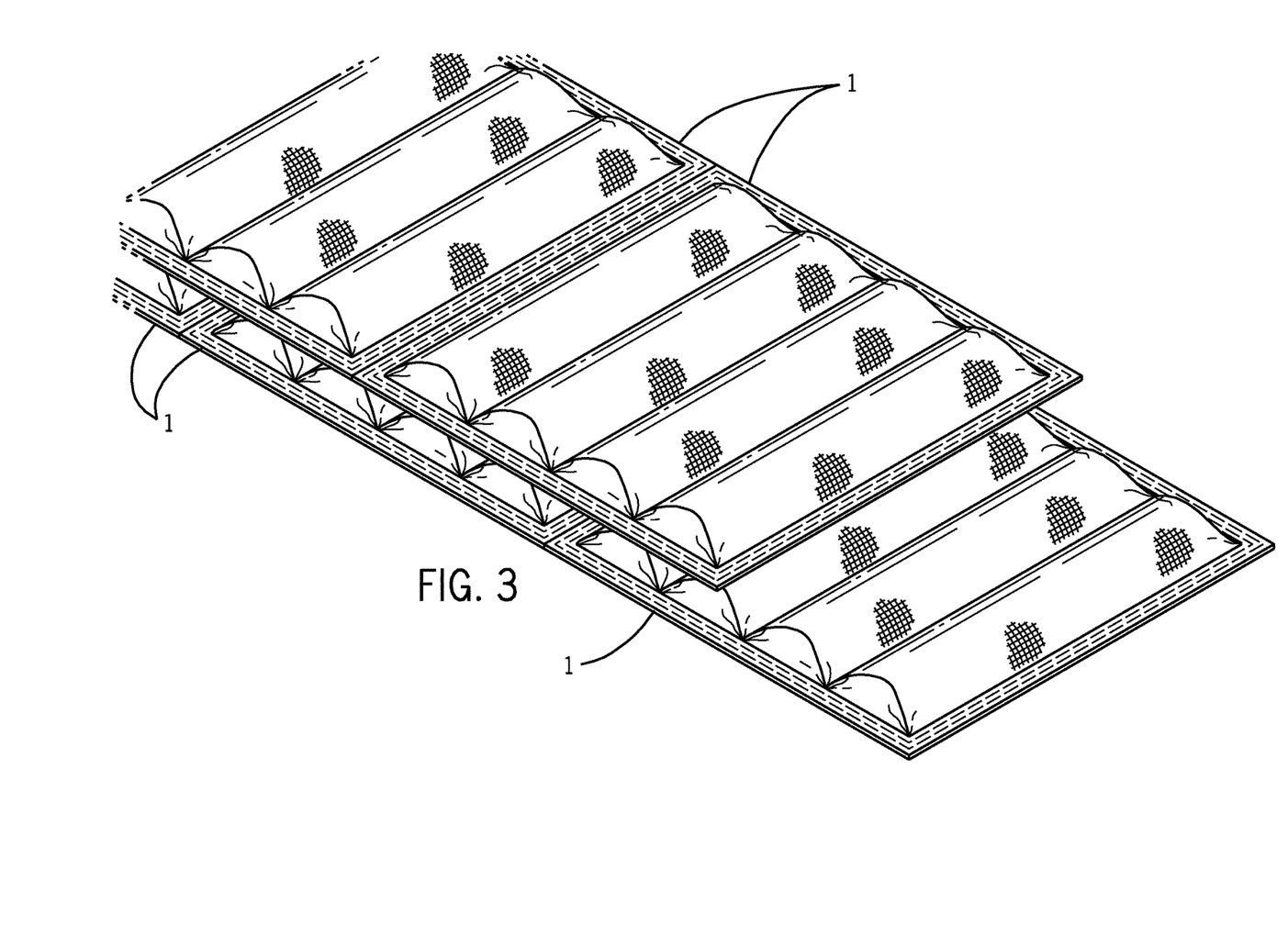
FIG. 3 depicts how the pocket bags can be placed in overlapping layers.

As depicted in FIG. 3, when the devices are staggered to form a barrier of two or more layers, the bottom lobes of the upper layer nestle into the space between the upper lobes of the underlying layer. This interlocking design eliminates large voids between layers, enhances structural stability and allows a robust, uniform barrier to be constructed with minimum material.

The width and length of the devices can be altered to obtain an optimal size for various applications. Devices have been constructed with pockets as narrow as 7.5 cm (3") and as wide and 30 cm (12"), though a width of 10 to 20 cm (4 to 8") is likely to prove most useful for many applications. The weight of individual units is a consideration especially when working in challenging environments such as coastal wetlands. Also, very long units are more difficult to manufacture. Most experimental devices manufactured to date have had widths between 40 cm (16") and 75 cm (30") and lengths between 45 cm (18") and 100 cm (40"). This range is manageable for construction and appears to be of sufficient width for most applications.

Where a longer device is preferable, individual pocket bags can be stitched together at their ends and subsequently rolled into a coil and banded for transport. If extremely long coils are need, they could be deployed by machinery. An additional advantage of producing longer units of pocket bags by concatenating a series of smaller pocket bags is that longer units can be easily trimmed to an appropriate length when deploying in the field.

The applicant has successfully constructed devices using treated and untreated burlap, woven polypropylene shade cloth, and both woven and unwoven landscape fabric. Synthetic fabrics such as polypropylene offer greater durability, whereas burlap and other natural fiber fabrics are biodegradable. As a rule, untreated burlap can be expected to maintain adequate structural integrity for approximately a year, possibly longer, in coastal environments. Burlap is typically commercially available as either 7 or 10 ounce cloth. These cloths are comprised of similar yarn, but the 7 ounce fabric offers a coarser mesh as it is less closely woven than 10 ounce burlap. Treating burlap with weakly soluble copper and zinc salts can increase its life expectancy by as much as a factor of two.

Synthetic fabrics are available in a range of meshes that are highly resistant to biodegradation and deterioration from UV light. Some of these fabrics are also highly resistant to tearing and abrasion. While openings in the fabric must be sufficiently small to retain aggregate, mesh size can be selected to determine the size and amount of suspended solids gaining entry and retained by the aggregate interior. Where accumulation of fine sediment is to be avoided, devices can be constructed with a fabric with a coarse weave and filled with a larger sized aggregate. To accumulate fine sediments, a moderate weave and finer aggregate can be used. Where the goal is to provide a barrier to prevent escape of soil-borne contaminants, devices can be constructed using a fine mesh such as landscape fabric designed to exclude soil while allowing water to pass. To improve durability, edges of the pocket bags can be reinforced with jute or polypropylene webbing.

Various grades (sizes) of manufactured aggregate are available. As a rule, the bulk density of the aggregate decreases as average diameter increases. Aggregates with average diameters of less than ½" were found most suitable for the pocket bags because those aggregates provided superior ability to filter suspended sediment and resulted in construction of narrow retaining walls with superior stability. Larger aggregates are also more fragile, and tend to fracture into smaller particles under heavy load.

TABLE 1

Porosity and pore distribution of three sizes of manufactured aggregates.

| Parameter | Units | >¼" | ¼-⅜" | ⅜-½" |
|---|---|---|---|---|
| Solids volume | cc/cc | 0.33 | 0.28 | 0.24 |
| Total voids | cc/cc | 0.67 | 0.72 | 0.76 |
| Bulk density (dry) | g/cc | 0.84 | 0.71 | 0.62 |
| H2O absorbed by aggregates | cc/cc | 0.22 | 0.21 | 0.16 |
| Volume of occluded pores | cc/cc | 0.15 | 0.13 | 0.12 |
| Voids external to aggregates | cc/cc | 0.30 | 0.38 | 0.48 |
| Avg. device density (dry) | g/cc | 1.20 | 1.20 | 1.19 |
| Avg. device density (sat) | g/cc | 1.41 | 1.41 | 1.35 |

Table 1 shows selected physical properties of ¼", ⅜" and ½" grades of aggregate having average diameters of <¼", ¼-⅜" and ⅜-½", respectively. The bottom two rows of Table 1 show the average density of devices filled with each of the three grades of aggregate, both dry and after pores are filled with water (saturated). Dry densities ranged from 1.19 to 1.20 g/cc and wet densities ranged from 1.35 to 1.41 g/cc. Submerged densities are similar to the density of most submerged marsh sediments found a few inches below the sediment surface, and therefore these devices are less likely to subside into the bottom sediments once a retaining wall is constructed. In contrast, the density of submerged fine sand is about 2.4 g/cc and that of limestone or granite rock more than 2.6 g/cm. Calculations indicate that when submerged in water, the force exerted by aggregate filled devices on underlying sediments is only 38% to 45% that exerted by an equivalent device filled with sand.

The initial goal of the applicant was to use the unique characteristics of lightweight aggregate to develop a method for reconstruction of coastal shoreline without the need of costly heavy equipment or extensive labor. While the units developed can be rapidly deployed to prevent erosion in damaged areas of inter-tidal marsh or shoreline until vegetative cover can be restored, they have many other applications for upland and wetland protection and restoration. For example, they can also be used to construct low-cost vegetated terraces in areas of shallow open water to provide valuable habitat. Variants can be to protect to intercept and absorb impending oil spills along marsh shoreline, promoting in situ degradation of oil as well as protecting sediments from erosion until vegetation can be restored.

Because they are resistant to movement by wave action, they can also be used to intercept oil expected to impact beaches. They can also be used to anchor shields and synthetic absorbents in place when heavy beach spills are anticipated, thus preventing oil from permeating sand or sediments. Because of their porosity, these devices can be used to construct semi-permeable barriers to enhance efficiency when hydraulic dredging is used to recreate inter tidal marsh. They can be used for crossing ditches and other wet areas where a firm surface is needed without impeding the flow of water.

Example Application #1 Units for Construction of Protective Barriers on Submerged Sediments The objective in Example Application #1 was to develop units that could be used to construct a protective barrier parallel to a shoreline in saline marsh at risk to erosion from tidal flow and wave energy. Individual units approximately 45 cm (18") wide by 75 cm (30") were constructed using 10 oz. burlap. Each pocket bag was partitioned into four evenly spaced pockets (18 cm×45 cm) each filled with 2 kg of ¼" aggregate to produce units weighing approximate 8.2 kg or about 25 lbs each. When stacked to create a barrier near a shore line, each layer increased the barrier height by 6 cm. A 10-layer barrier resulted in a wall whose upper elevation was approximately that of the mean tide line. This wall appears stable in the presence of significant tidal flow and moderate wave energy. Its persistence and ability to entrap suspended sediment is under evaluation.

Example Application #2 Units for Protection of Non-Vegetated Shoreline

Figure 2:
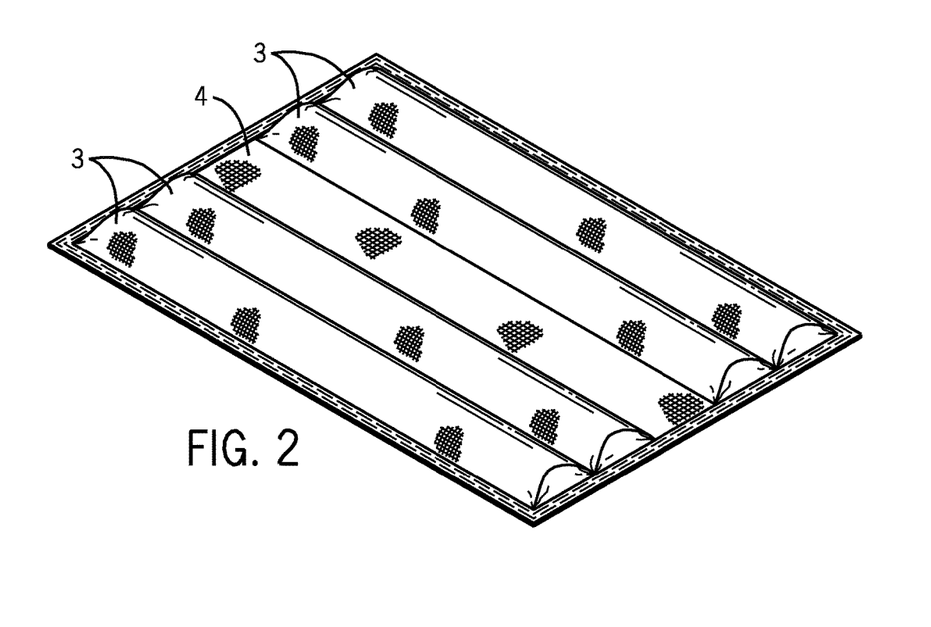
FIG. 2 depicts an additional preferred embodiment of a pocket bag in which the middle pocket is not filled with aggregate.

The objective was to produce a structure that would remain in place in the presence of occasional significant wave energy to protect the underlying sediments from erosion. Units approximately 75 cm (30") wide by 45 cm (18") long were constructed using 10 oz. burlap partitioned into five narrow (3.5 cm) evenly spaced pockets, as approximately depicted in FIG. 2. The outer pockets 3 on each side were each filled with 0.5 kg of ¼" aggregate before being stitched close. As depicted in FIG. 2, middle pocket 4 was left empty so that it could be easily slit for planting bare rooted culms of marsh plants. After deploying the units depicted in FIG. 2 below the high tide line in a saline coastal marsh, three 10 cm (4") slits were cut along middle pocket 4 and bare rooted culms of *S. alterniflora* were inserted into the marsh sediment. The survival rate for these plants was greater than 95%, which greatly enhances the ability of the structures to protect the shoreline.

Example Application #3 Temporary or Semi-Permanent Roadways in Muddy Areas

The objective was to develop units that can be deployed in boggy areas of dirt work roads or used to provide passage through shallow drainage ditches. These units were designed to provide a firm bed to support the passage of a light truck yet allow water to continue to flow. Individual units approximately 75 cm (30") wide by 75 cm (30") long constructed using polypropylene shade cloth (60%) partitioned into four evenly spaced pockets. Edges were reinforced with 3" polypropylene webbing. Each pocket was filled with 1.5 kg of ¼" aggregate. After stitch closure of each pocket bag using an additional piece of webbing, five units were stitched end to end to produce a long unit 75 cm (30") by 375 cm (150"). These long units were rolled into coils weighing approximately 32 kg (70 lbs) each.

Example Application #4 Barriers to Prevent Offsite Contamination by Soil or Soil-Borne Contaminants For this example application, the objective was to develop units that can be deployed at construction or reclamation sites to prevent influx or outflow of soil or soil-borne contaminants in surface runoff water without significantly compromising surface drainage. Individual pocket bags approximately 45 cm (18") wide by 75 cm (30") were constructed using 5 oz. landscape fabric. This fabric was used because it allows passage of water but pores are sufficiently small to prevent passage of most soil particles. Each unit was partitioned into four evenly spaced pockets (18 cm×45 cm) each filled with 2 kg of ¼" aggregate to produce units weighing approximate 8.2 kg or about 25 lbs each. Polypropylene webbing was sewn around all edges. A 3-layer barrier resulted in a retaining wall with a height of approximately 19 cm (8").

Figure 4:
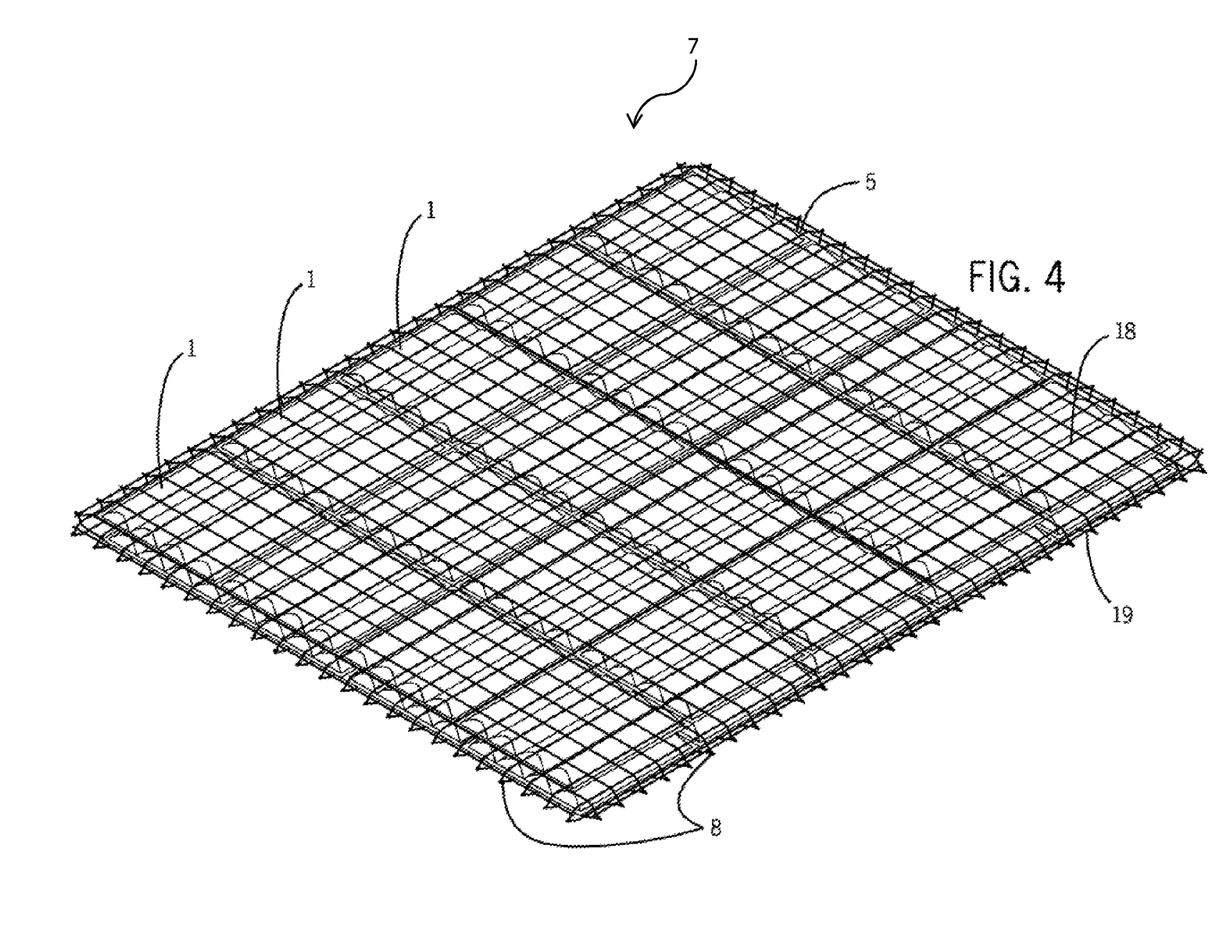
FIG. 4 depicts a layer of pocket bags that are encased from the top and bottom in web material.

FIG. 4 depicts a preferred embodiment in which several pocket bags 1 are encased in grid material 5 so as to create mat 7. Mat 7 is a near-neutral density articulating revetment mat that can be deployed in multiple settings for multiple purposes. Pocket bags 1 are held in place by the upper and lower layers of grid material 5. Hog rings (not shown) are used to attach first layer 18 (upper side in FIG. 4) of grid material 5 and second layer 19 of grid material 5 along mat edges 8 and at intermittent points between pocket bags 1. Grid material can be any material that of a suitable stiffness and porosity. One such material that is commercially available is known as "geogrid" and is particularly suited for this application. Mat 7 can be used directly as an erosion control device, either to shore up the side of a levee, berm, or bank; or to add elevation to any submerged or semi-submerged formation.

Figure 5:
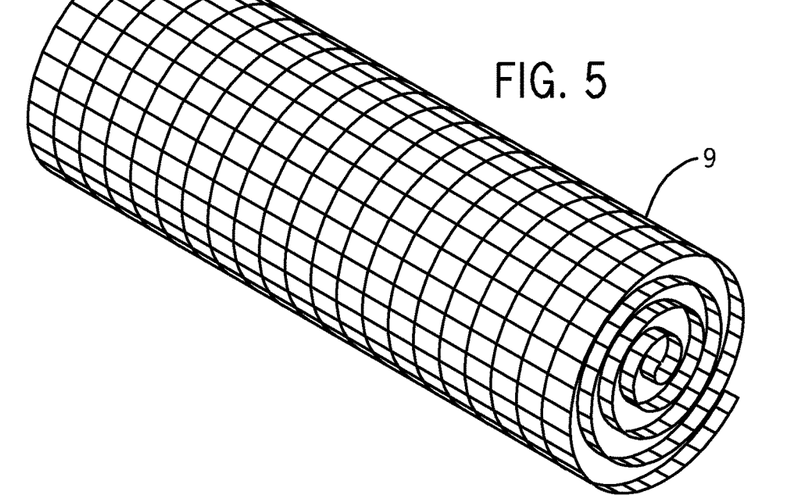
FIG. 5 depicts an aggregate log that has been constructed by rolling an encased layer of pocket bags.

FIG. 5 depicts another preferred embodiment of the erosion control device. FIG. 5 depicts an aggregate log 9 that was created by rolling up mat 7. The applicant has discovered that an optimal configuration for construction of log 9 is to use 12 pocket bags 1 that are laid out in a 3×4 grid pattern in mat 7. The mat is then rolled into log 9. Log 9 is kept in a rolled configuration by hogrings (not show) or any number of suitable tying members (e.g. cable ties) that will be known to those skilled in the art.

Figure 6:
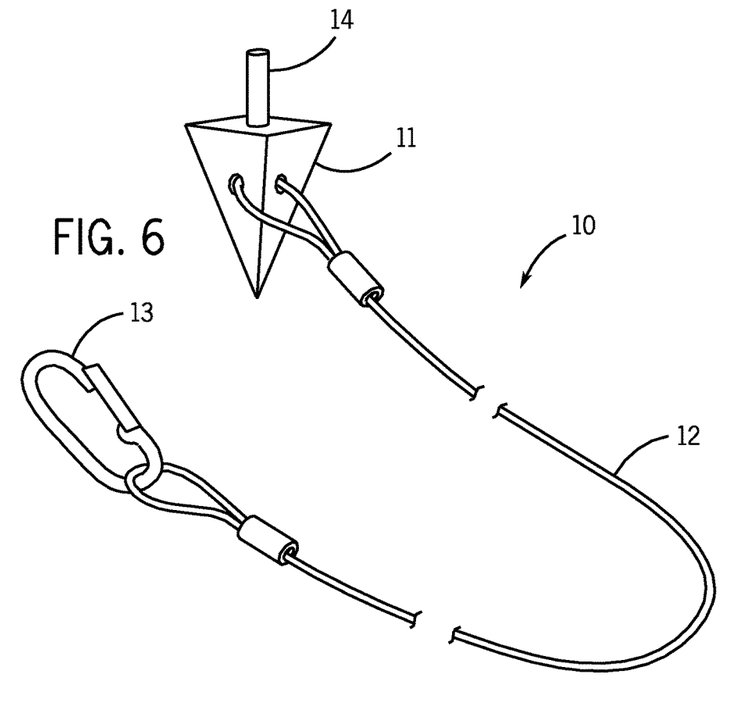
FIG. 6 depicts an anchor cable system that can be used to fix an aggregate log in the soil.

FIG. 6 depicts anchor system 10 that is used to secure mat 7 or log 9 to a formation. Anchor system includes anchor 11, cable 12, and connector 13. Anchor 11 includes driving post 14. Driving post 14 is designed to fit into a cavity on a rod that a person can use to push the anchor into a formation. Anchor system is especially suited for anchoring mats 7 or log 9 in soft soils.

Figure 7:
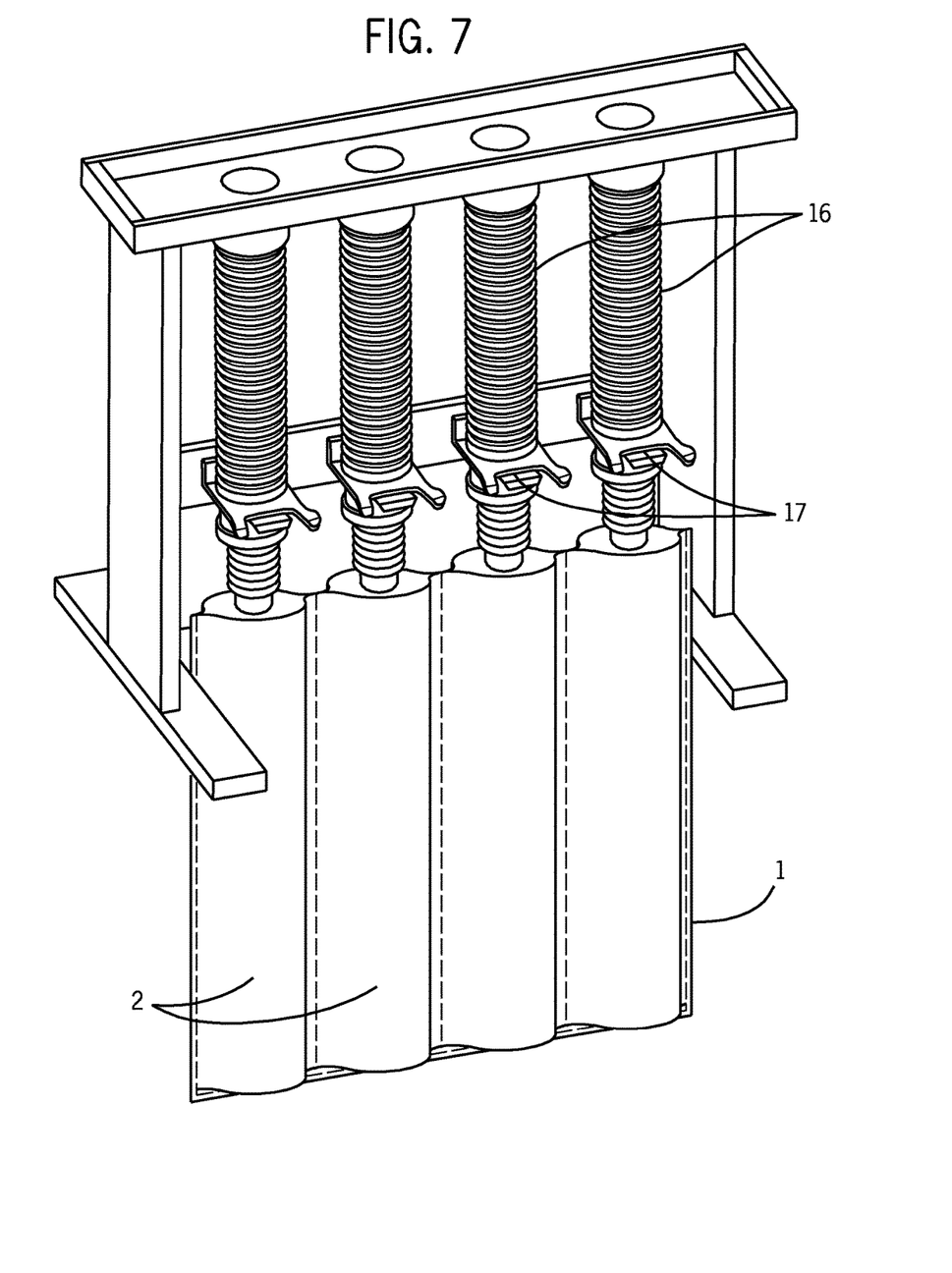
FIG. 7 depicts a preferred embodiment of a device that can be used for filling the pocket bags.

FIG. 7 depicts filler 15 which is designed to expedite the filling of pocket bags 1. The arrangement of filler tubes 16 can be adapted for various configurations of pocket bags 1. Fill controls 17 can be set to fill all pockets or to leave a pocket empty as depicted in FIG. 2.

Figure 8:
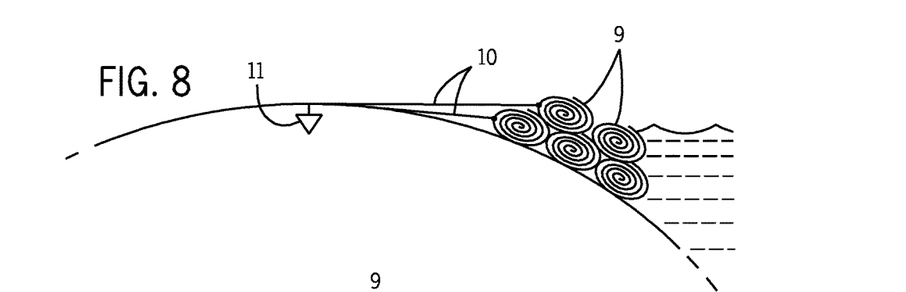
FIG. 8 is a side view showing a number of aggregate logs being used on the side of an existing formation.

FIG. 8 is a side view showing a number of logs 9 being used on the side of an existing formation. Logs 9 are held in place by a number of anchor systems 10. Multiple anchor systems 10 can be used to anchor each log 9. Logs 9 can also be attached to one another with hog rings or other tying members (e.g. cable ties, wire twist ties) to help solidify the entire erosion control structure formed by multiple logs 9.

Figure 9:
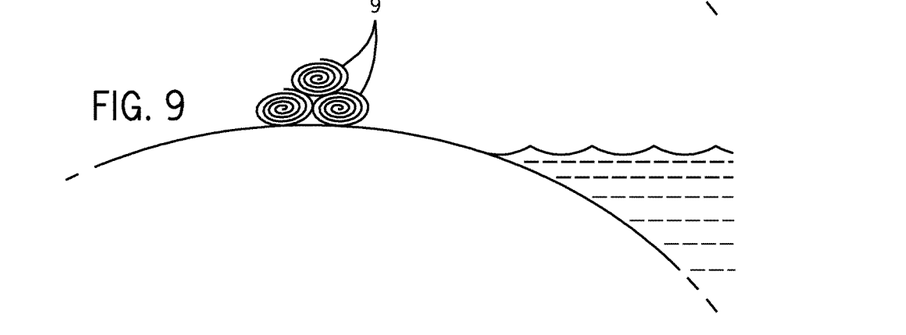
FIG. 9 is a side view showing a number of aggregate logs being used to raise the level of an existing formation.

FIG. 9 is a side view showing a number of aggregate logs 9 being used to raise the elevation level of an existing formation. While anchor systems 10 are not shown in FIG. 9, they can be employed to help stabilize logs 9. Hog rings or other connectors can be used to interconnect logs 9.

Figure 10:
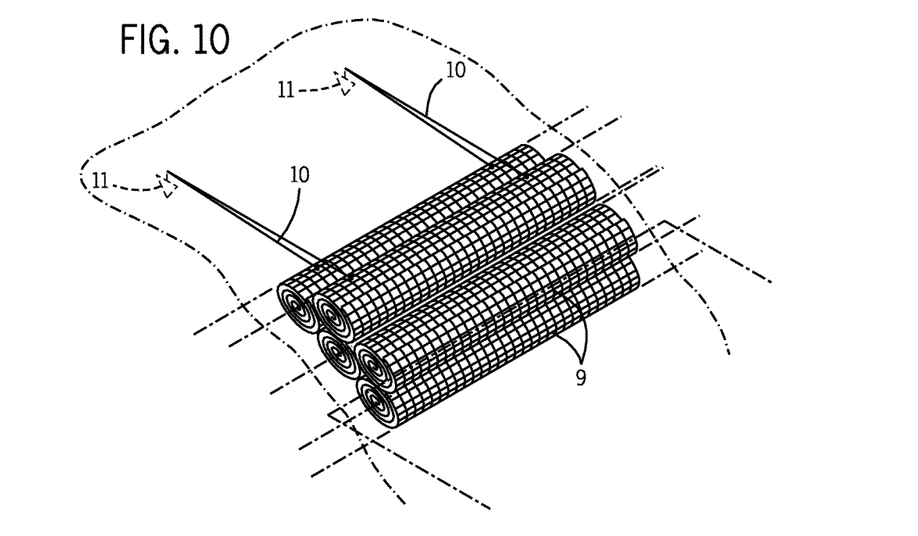
FIG. 10 is a perspective view showing a number of aggregate logs being used on the side of an existing formation.

FIG. 10 is a perspective view showing a number of aggregate logs being used on the side of an existing formation. In the embodiment shown in FIG. 10, logs 9 are stacked such that the upper logs nest in the depressions formed by adjacent logs 9 in the lower layer. Those skilled in the art may also choose to place logs 9 in an end to end configuration. In such a configuration, the ends of logs 9 can be connected by hog rings or other connectors.

The lightweight aggregate may also be contained in large single or multi-chamber bags and used as an internal base for construction of dikes. In this embodiment, a number of bags containing lightweight aggregate are placed in an overlapping pattern (with the overall structure having a triangular cross section) to form what will serve as the internal section of a dike. Typically larger bags are used in the base of the triangle and smaller bags toward the top of the triangular structure. In one preferred embodiment the bags will contain between 1 and 5 cubic yards of lightweight aggregate. After the internal structure is complete, the dike is finished with a layer of conventional rock or riprap. In another preferred embodiment, large single or multi-chamber bags filled with lightweight aggregate can be used as a base upon which multiple mats 7 may be placed.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

INDUSTRIAL APPLICABILITY

The invention as claimed has industrial applicability in that it can provide coastal restoration. The invention can also provide protection against an oil spill or a discharge of other pollutants in a body of water.

What is claimed:

1. A device for coastal restoration comprising:
   a. a bag made of fabric, said bag having a first side and a second side;
   b. said bag having a plurality of pockets, said pockets being created by fastening said first side to said second side at a plurality of points, wherein said plurality of pockets includes a center pocket;
   c. said bag and said plurality of pockets being adapted such that when aggregate material is placed in said bag, said pockets form upper and lower lobes;
   d. wherein all said pockets except said center pocket are filled with dry lightweight aggregate manufactured by a rotary kiln, said center pocket being empty;
   e. wherein said dry lightweight aggregate has a dry bulk density that is no greater than 0.68 grams per cubic centimeter; and
   f. wherein said dry lightweight aggregate will not harden when placed in water.

2. The device in claim 1, wherein said bag is constructed of synthetic mesh fabric.

3. The device for coastal restoration of claim 1 wherein said device for coastal restoration has an average density when dry that is no greater than 1.20 grams per cubic centimeter.

4. A method for coastal restoration comprising:
   a. providing a fabric bag, said bag comprising:
      i. a first side and a second side;
      ii. a plurality of pockets, said pockets being created by fastening said first side to said second side at a plurality of points; and iii. said bag and said plurality of pockets being filled with dry lightweight aggregate manufactured by a rotary kiln so that said pockets form upper and lower lobes, wherein said dry lightweight aggregate has a dry bulk density that is no greater than 0.68 grams per cubic centimeter; and iv. wherein said dry lightweight aggregate will not harden when placed in water; and b. placing a plurality of said bags on a shoreline.

5. A device for coastal restoration comprising:

a. a plurality of bags made of fabric, each said bag having a first side and a second side;

b. each said bag having a plurality of pockets, said pockets being bordered by fastening said first side to said second side at a plurality of points;

c. a quantity of aggregate material in each said pocket of each bag so as to form upper and lower lobes;

d. a mat having a first layer and a second layer, said first and second layers having intermittent points and edges, said first and second layers being attached at said intermittent points and at said edges;

e. said plurality of bags being held in place between said first and second layers of said mat;

f. said first and second layers being made of grid material that is adapted to hold said plurality of bags in place in said mat;

g. wherein said pockets are filled with said aggregate material, and wherein said aggregate material is dry lightweight aggregate manufactured by a rotary kiln;

h. wherein said dry lightweight aggregate has a dry bulk density that is no greater than 0.68 grams per cubic centimeter; and i. wherein said dry lightweight aggregate will not harden when placed in water.

6. The device for coastal restoration of claim 5, wherein said mat is connected to a plurality of anchor systems.

7. The device for coastal restoration of claim 5, wherein said mat is rolled into a log, said log being formed by attaching said mat to itself with a plurality of tying members.

8. The device for coastal restoration of claim 7, wherein said log is connected to a plurality of anchor systems.

9. The device for coastal restoration of claim 7, further comprising a plurality of said logs, said plurality of logs being stacked on each other in a nesting configuration and connected to each other with additional tying members.

10. A method of coastal restoration comprising:

a. providing a plurality of bags made of fabric; each said bag comprising:

i. a first side and a second side;

ii. a plurality of pockets, said pockets being bordered by fastening said first side to said second side at a plurality of points;

iii. a quantity of dry lightweight aggregate in each said pocket of each bag so as to form upper and lower lobes;

iv. wherein said dry lightweight aggregate is manufactured by a rotary kiln;

v. wherein said dry lightweight aggregate has a dry bulk density that is no greater than 0.68 grams per cubic centimeter; and vi. wherein said dry lightweight aggregate will not harden when placed in water;

b. providing a mat comprising:

i. a first layer and a second layer, said first and second layers having intermittent points and edges, said first and second layers being attached at said intermittent points and at said edges;

ii. said plurality of bags held in place between said first and second layers; and iii. wherein said first and second layers are made of grid material that is adapted to hold said plurality of bags in place in said mat;

c. placing said a mat on a shoreline to control erosion; and d. anchoring said mat to said shoreline.

* * * * *